March 15, 1966 L. W. SCHREINER 3,240,874

CONTRAST CONTROL FOR A VIDIO AMPLIFIER INCLUDING
A SPACED APART VARIABLE INPEDANCE DEVICE

Filed June 27, 1962

Inventor.
Louis W. Schreiner.
By. Hofgren, Brady, Wegner,
Allen & Stellman
Attorneys.

United States Patent Office 3,240,874
Patented Mar. 15, 1966

3,240,874

CONTRAST CONTROL FOR A VIDEO AMPLIFIER INCLUDING A SPACED APART VARIABLE IMPEDANCE DEVICE

Louis W. Schreiner, Palatine, Ill., assignor to Warwick Electronics Inc., a corporation of Delaware Filed June 27, 1962, Ser. No. 205,601
7 Claims. (Cl. 178—7.3)

This invention relates to an electrical circuit, and, more specifically, to the video output stage circuit for a television receiver incorporating a contrast control.

Design of modern day television receivers requires that certain manual controls be provided which may be operated by the viewer to provide optimum viewing conditions for individual tastes. Included among these, are the brightness and contrast controls which are often adjusted at the same time, and, therefore, should be located where they are accessible to the viewer. On the other hand, circuit design requirements indicate that for the optimum operation a television receiver video output circuit should be located on the chassis in proximity to the other circuits of the set. With this arrangement, the signal is moved within the chassis a minimum amount of distance, reducing shielding and interference problems.

In one form of contrast control there is a potentiometer coupled in the output stage of the video amplifier circuit, which has the video signal thereon. To prevent bringing portions of the video signal away from the chassis to the control knob of the contrast control, it has been necessary in the past to provide complicated mechanical drives between the knob and the potentiometer if it is located in the chassis remote from the control knob, or to provide special circuitry between the video output stage and the potentiometer if it is located remotely from the chassis of the television set.

It is an object of this invention to provide an improved video contrast control.

It is a further object of this invention to provide the contrast control located remotely from the main portion of the television chassis.

It is yet a further object of the invention to provide a video contrast control circuit which is extremely flexible in its location in the television receiver, and, at the same time, is of inexpensive construction and cost.

Accordingly, one feature of the invention is to provide in a television signal receiving set, including an image display device and a video amplifier stage, a contrast control comprising: a variable impedance device spaced from the video amplifier stage for varying the amplitude range of the stage; and means including a cable having a plurality of wires with fixed spaced relationship therebetween coupling the variable impedance to the video amplifier stage.

It is yet a further feature of the invention to provide a three-wire cable coupling the variable impedance device to the video amplifier stage wherein the capacitance between wires is of a predetermined magnitude. It is still a further feature of the invention to provide a video contrast control having a reduced number of components and improved operating characteristics.

It is still a further feature of the invention to provide a video contrast control of inexpensive construction having extreme flexibility of location with respect to the cabinet of a television receiver.

Further objects and features of the invention and advantages thereof will become apparent from the following detailed description taken in conjunction with the accompanying drawings, wherein like reference numerals refer to like elements, and in which.

Figure 1:
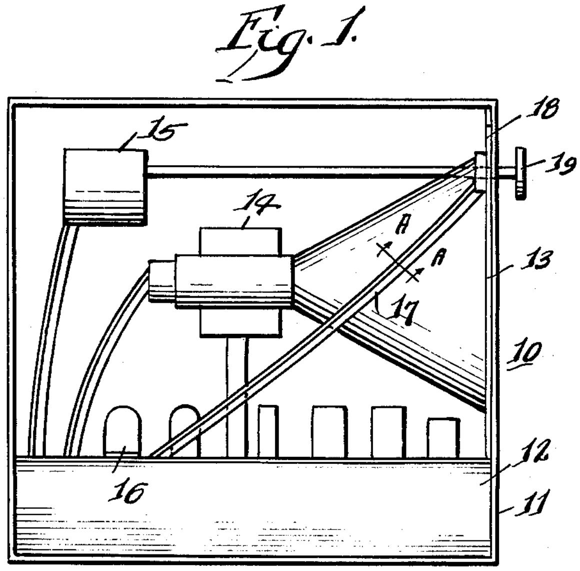
FIGURE 1 is a side elevational view partly in cross section of a television receiver embodying the invention.

While the invention is susceptible of embodiments in many different forms, there is shown in the drawings which will be described in detail, one embodiment of the invention with the understanding that the present disclosure is to be considered as an exemplification of the principles of the invention, and is not intended to limit the invention to the embodiment illustrated. The scope of the invention will be pointed out in the appended claims.

Referring now to FIGURE 1, a television receiver 10 is shown partly in cross section, including a housing 11, a chassis 12 and a cathode ray tube 13. The cathode ray tube is mounted for viewing and has a deflection coil 14 about the neck thereof. A tuner 15 actuated by a knob (not shown) is provided for selecting the channel to be viewed. A video amplifier tube 16 is shown mounted in the rearward portion of the chassis 12 and is coupled by a cable 17 to a potentiometer 18 mounted on the front portion of housing 11. A knob 19 is provided for varying the potentiometer, controlling the contrast of the picture displayed by the receiver.

By location of the tube 16 at the rear of the chassis, proper shielding of this stage is accomplished with a minimum of interference introduced in the set, and at the same time, the location of the potentiometer 18 and knob 19 provides for easy control of the contrast conditions within the tube 13 by the viewer. Since the cable 17 is flexible, the potentiometer may be located at any point on the housing 11 dictated by design characteristics or aesthetic values.

Figures 3, 4:
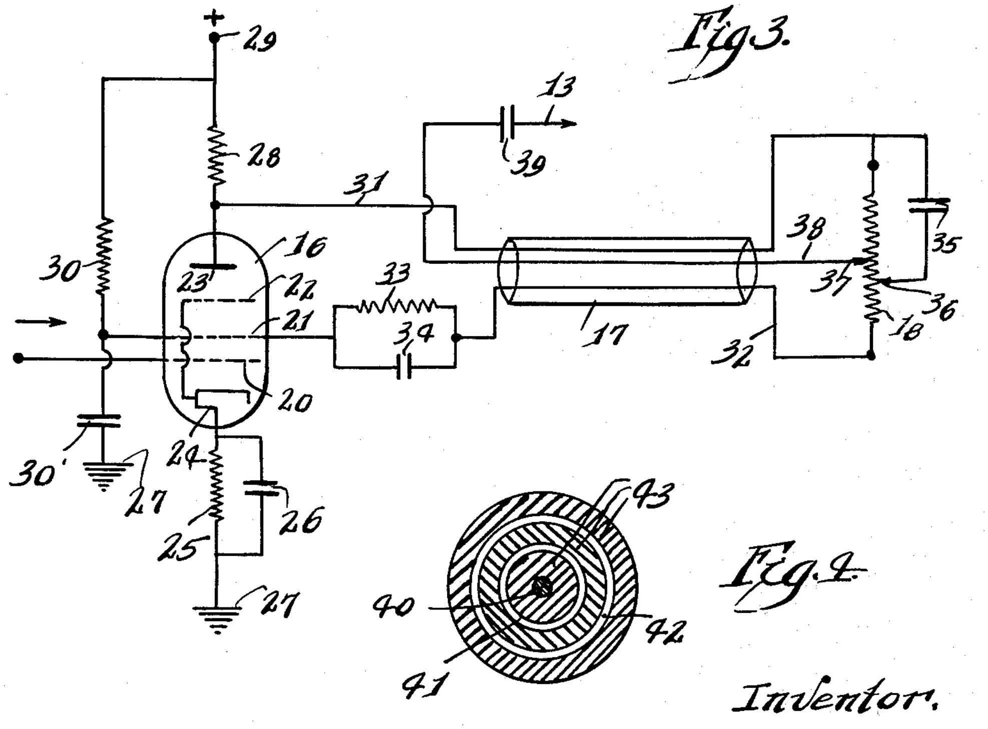
FIGURE 3 is a schematic diagram of a circuit embodying the invention.
FIGURE 4 shows a cross sectional view of a triaxial cable.

FIGURE 3 shows the video amplifier circuit of the receiver 10 of FIGURE 1 and includes video amplifier tube 16 having control, screen, and suppressor grids 20, 21 and 22, a plate 23 and a cathode 24. The cathode is connected through a resistor 25 shunted by a capacitor 26 to a point of reference potential, in this case, ground 27. The plate 23 is connected through a resistor 28 to a source of positive potential 29. Suppressor grid 22 is connected to cathode 24, and the screen grid 21 is connected through a resistor 30 to the source of positive potential 29 and through a capacitor 30' to ground. The control grid 20 is connected to receive the video signal from the previous stage in the television circuit and controls the flow of electrons through tube 16. This is a fairly standard video amplifier stage wherein a received signal on grid 20 is amplified and reproduced at the plate 23.

The video contrast control is provided by connecting a lead 31 between the plate 23 of tube 16 and one end of variable resistor 18, the other end of which is coupled through a lead 32 and a parallel circuit consisting of a resistor 33 and a capacitor 34 to screen grid 21. A capacitor 35 is connected between lead 31 and a fixed point 36 on resistor 18. A variable tap 37 is connected by a lead 38 through the coupling capacitor 39 to supply the video output to the picture tube 13.

In operation, capacitor 30' is substantially a short circuit to signals in the frequency range of the video signal, and resistor 33 and potentiometer 18 provide a voltage dividing network between plate 23 and ground. Variable tap 37 serves to couple varying amounts of the signal voltage to the picture tube, and, hence, vary the contrast of the reproduced image on the face of tube 13.

Figure 2:
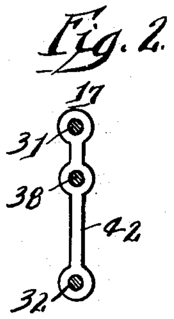
FIGURE 2 is a cross section along lines A—A in FIGURE 1.

The leads 31, 38 and 32 are arranged in a predetermined manner to provide constant reactance therebetween, and FIGURE 2 shows one form of such arrangements. Therein, leads 31 and 38 are spaced relatively closely to each other compared to lead 32 and are held in such fixed relationship by an insulating material 42. With this construction, uniform distributed capacitance exists between the respective leads, and by proper selection of cable length, compensation for time and frequency response shift due to capacitive reactance between the movable contact 37 and ground may be made. The signal to the tube is taken from lead 38 since capacity between leads 31 and 38 is desirable while capacity between leads 31 and 32 should be kept as small as possible.

FIGURE 3 clearly shows the advantages of this contrast control circuit. The video coupling capacitor 39 may be located on the chassis 12 at a point where it may be properly mounted and supply the signal to tube 13. In addition, the elements resistor 33 and capacitor 34 are also mounted on the main chassis pan thus keeping the control 18 in a simple configuration so it may be located any place on the housing 11 of receiver 10, and the contrast of the produced image varied without providing complicated mechanical coupling between knob 19 of FIGURE 1 and variable resistor 18.

FIGURE 4 shows a triaxial cable including three wires 40, 41 and 42 separated and encased by an insulating material 43 which may be substituted for 17 in FIGURES 1 and 3.

One operative embodiment of the invention incorporated in a television set has components of the following values and dimensions.

| Item: | | Value |
|---|---|---|
| Capacitor **30′** | microfarads | 2 |
| Resistor **30** | ohms | 27,000 |
| Resistor **25** | do | 15 |
| Capacitor **26** | microfarads | .033 |
| Resistor **28** | ohms | 7,500 |
| Resistor **33** | do | 3,900 |
| Capacitor **34** | micromicrofarads | 47 |
| Capacitor **39** | microfarads | .1 |
| Capacitor **35** | micromicrofarads | 27 |
| Potentiometer **18** | ohms | 30,000 |
| Distance between wires **31**, **38** | inches | .085 |
| Distance between wires **32**, **38** | do | .190 |
| Capacity between wires **38**, **32** | micromicrofarads per foot | 7.25 |
| Capacity between wires **31**, **32** | do | 6.25 |
| Length of cable **17** | inches | 18 |

I claim:

1. In a television signal receiving set including an image display device having a video input element, a video amplifier stage comprising: an electronic discharge device including anode, cathode and a plurality of control electrodes; a source of video signal connected with one of said control electrodes; a source of energizing potential including a point of reference potential; an impedance connected between said anode and said source of potential establishing at said anode a point of fixed gain; a variable impedance device remotely located from said video amplifier including two ends and a movable contact; and means for connecting said electronic discharge device and the video input element of said image display device to said variable impedance device, including first, second and third wires maintained in fixed space relationship by an insulating material and having substantially uniform distributed capacitance therebetween, said second wire connecting said anode to one end of said variable impedance, said first wire joining another of said control electrodes of said device with the other end of said variable impedance, and said third wire coupling said movable contact to the input element of said image display device.

2. The device as claimed in claim 1 wherein the three wires are triaxially spaced.

3. In a television receiving set including an image display device having a video input element, a video amplifying stage comprising: an amplifying device including an input and a pair of output electrodes; a source of video signal connected with said input electrode; a potentiometer having a resistance element and a movable tap for varying the contrast of the image on said display device, said potentiometer being spaced from said amplifying device; means for connecting said amplifying device and the video input element of said image display device to said potentiometer, including a cable having three wires with fixed spacial relationships and distributed impedances, two of said wires being coupled between the output electrodes of said amplifying device and the resistance element of said potentiometer, and the third wire connecting the movable tap of the potentiometer with the video input element of the display device.

4. The video amplifying stage of claim 3 wherein said first, second and third wires are substantially coplanar and have parallel longitudinal axes.

5. The video amplifying stage of claim 4 wherein said output electrodes are the anode and the screen grid electrodes of said amplifying device, said second wire is connected with the anode, said first wire is connected with said screen grid and said third wire is positioned between said first and second wires and is spaced from said second wire approximately one-third the distance between said first and second wires.

6. The video amplifying stage of claim 5 wherein there is distributed capacity between the first wire and the third wire of approximately seven micromicrofarads per foot and between the second wire and third wire of approximately six micromicrofarads per foot.

7. In a television receiving set including an image display device having a video input element, a video amplifying stage comprising: an amplifying device including an input and a pair of output electrodes; a source of video signal connected with said input electrode; a variable impedance device remotely located from said video amplifier including two ends and a movable contact; and means for connecting said amplifying device and the video input element of said image display device to said variable impedance device including first, second and third wires maintained in fixed spacial relationship by an insulating material and having substantially uniform distributed capacitance therebetween, said first wire joining one output element of said amplifying device to one end of said variable impedance, said second wire joining the other output element of said amplifying device to the other end of said variable impedance, and said third wire coupling said movable contact to the video input element of said image display device.

References Cited by the Examiner

UNITED STATES PATENTS

| | | | |
|---|---|---|---|
| 2,234,461 | 3/1941 | Tubbs | 330—154 |
| 2,853,549 | 9/1958 | Denton | 178—7.5 |
| 2,881,245 | 4/1959 | Fenton et al. | 178—5.4 |

FOREIGN PATENTS

| | | |
|---|---|---|
| 159,314 | 10/1954 | Australia. |
| 1,243,295 | 8/1960 | France. |

DAVID G. REDINBAUGH, *Primary Examiner.*